No. 734,896. PATENTED JULY 28, 1903.
L. A. LAMMERTS.
PORTABLE ELECTRIC ACCUMULATOR.
APPLICATION FILED JUNE 20, 1902.
NO MODEL.
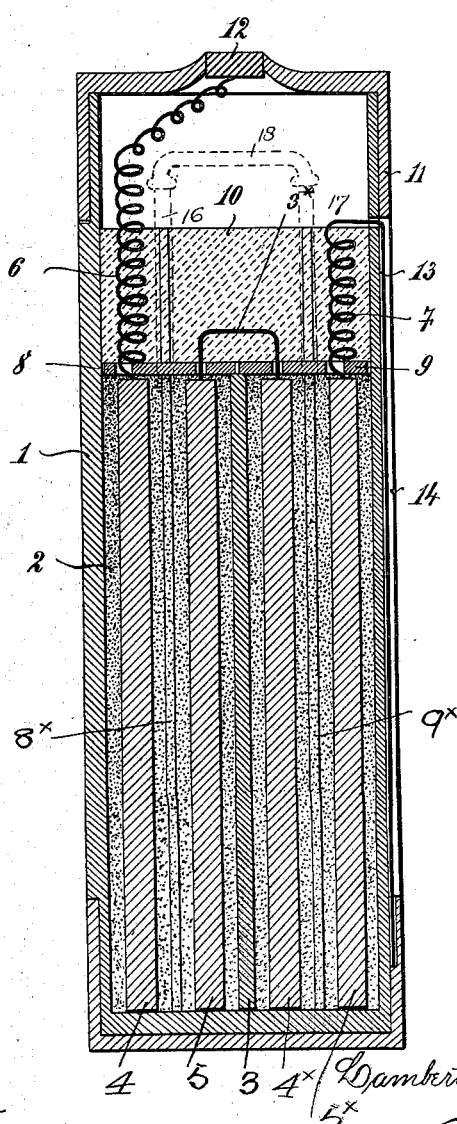
WITNESSES:
INVENTOR.
Lambertus Alphonsus Lammerts
BY
Richardson
ATTORNEYS.

No. 734,896.

Patented July 28, 1903.

UNITED STATES PATENT OFFICE.

LAMBERTUS ALPHONSUS LAMMERTS, OF ROTTERDAM, NETHERLANDS.

PORTABLE ELECTRIC ACCUMULATOR.

SPECIFICATION forming part of Letters Patent No. 734,896, dated July 28, 1903.

Application filed June 20, 1902. Serial No. 112,482. (No model.)

*To all whom it may concern:*

Be it known that I, LAMBERTUS ALPHONSUS LAMMERTS, a subject of the Queen of the Netherlands, and whose post-office address is No. 11 Kalverstraat, Rotterdam, in the Netherlands, have invented certain new and useful Improved Portable Electric Accumulators, of which the following is a specification.

This invention relates to portable electric accumulators—that is to say, small accumulators—which are carried by the user in the pocket or are fixed to bicycles in connection with an electric incandescent lamp and the like, and has for its object to secure the conductors between the electrodes and pole-terminals as effectively as possible from oxidation.

It is generally known that in portable accumulators the electrodes and pole-terminals are connected by straight wires which are soldered to the upper ends of the terminal electrodes and thence extend upward for a certain distance, passing through a space or chamber, into the lower part of which non-conducting or insulating material is cast to seal up the cells, while its upper part, from which atmospheric air is shut out by a lid or cover, contains a gas-intercepting device. Experience has shown that with this shape of the connecting-wires the latter are liable to comparatively rapid destruction, as the joint between them and the inclosing material is not sufficiently tight to prevent moisture from the electrolyte or moist gases or vapors from penetrating and attacking said wires.

According to this invention a good protection for the connecting-wires from the injurious influences above named is secured by constructing the connecting-wires in the shape of cylindrically-coiled helical springs, as this shape has proved to permit the insulating material cast above the cells closely to adhere to and tightly surround the wires on all points.

On the annexed sheet I have shown in a somewhat schematical manner an accumulator of the type described provided with my improvement, the figure being a vertical central section through the upper part of the device.

The outer casing 1, of non-conducting material and preferably of cylindrical shape, contains embedded in suitable absorbing material 2, (such as chemically-purified sponge, for instance,) which imbibes and retains the electrolyte—as, for example, dilute sulfuric acid—two pairs of electrodes in the form of plates 4 5 and 4* 5*, separated from each other by a vertical non-conducting wall 3 and electrically connected in series by a wire 3*. To the electrodes 4 and 5* wires 6 7, formed into the shape of cylindrical helical springs, are soldered or welded. The two cells are covered with thin, non-conducting, acid-proof plates 8 9 of, say, india-rubber, celluloid, or the like, said plates being secured in the proper position by vertical grooves 8* and 9*, into which they are engaged by small projections. The space above these plates is sealed up with a non-conducting material 10, such as asphalt, the sealing rising to such a level as to leave sufficient space for the accommodation of the usual gas-collector, (not shown,) which consists in a short length of india-rubber tube 18, passed with its ends over the open upper ends of two small glass tubes 16 and 17, extending from said space down through the sealing mass 10 and the plates 8 9 into the cells, so as to constitute openings through which gases that occur to be evolved in the cells can escape from the latter and collect in the india-rubber tube. After insertion of the gas-collector said space is closed by means of a lid or cover 11. The wire 6 serves to make electrical connection with a pole-terminal 12, fitted in the cover 11, while to the wire 7 there is soldered a connecting-wire 13, which is conducted downward through an external groove 14, provided in the casing 1 for the purpose and connected to a pole-terminal, which consists of a metal cap 15 passed over the lower end of the casing, as is well known.

What I claim as my invention is—

In a portable electric accumulator of the kind described, the combination with the electrodes, the terminals and the sealing-up mass, of connecting-wires embedded in said sealing mass and formed in the shape of cylindrical helical springs, substantially as and for the purpose stated.

In testimony whereof I have hereunto set my hand in presence of two subscribing witnesses.

LAMBERTUS ALPHONSUS LAMMERTS.

Witnesses:
S. LISTOE,
AIRE H. VOORWINDEN.